(12) United States Patent
Small, Jr. et al.

(10) Patent No.: US 10,611,120 B2
(45) Date of Patent: Apr. 7, 2020

(54) MULTI-LAYERED FABRIC LAMINATES AND METHODS OF MAKING AND USING THE SAME

(71) Applicant: Precision Fabrics Group, Inc., Greensboro, NC (US)

(72) Inventors: James D. Small, Jr., Greensboro, NC (US); W. Scott Kinlaw, Greensboro, NC (US); Randell Zane Mitchell, Greensboro, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 128 days.

(21) Appl. No.: 15/460,870

(22) Filed: Mar. 16, 2017

(65) Prior Publication Data
US 2017/0266915 A1 Sep. 21, 2017

Related U.S. Application Data (60) Provisional application No. 62/320,071, filed on Apr. 8, 2016, provisional application No. 62/310,354, filed on Mar. 18, 2016.

(51) Int. Cl.
*B32B 5/26* (2006.01)
*A47C 23/00* (2006.01)
*B32B 5/02* (2006.01)
*B32B 37/06* (2006.01)
*B32B 37/12* (2006.01)

(52) U.S. Cl.
CPC ............ *B32B 5/26* (2013.01); *A47C 23/00* (2013.01); *B32B 5/022* (2013.01); *B32B 37/06* (2013.01); *B32B 37/12* (2013.01)

(58) Field of Classification Search
CPC ........... B32B 5/26; B32B 5/022; B32B 37/06; B32B 37/12; A47C 23/00
See application file for complete search history.

(56) References Cited

U.S. PATENT DOCUMENTS

| | | | | |
|---|---|---|---|---|
| 5,942,452 | A * | 8/1999 | Daponte | B32B 5/26 442/382 |
| 2002/0106959 | A1 * | 8/2002 | Huffines | B32B 27/12 442/394 |
| 2005/0227558 | A1 * | 10/2005 | Small, Jr. | D06M 11/72 442/136 |
| 2007/0175195 | A1 * | 8/2007 | Skirius | B01D 39/1623 55/527 |
| 2014/0242324 | A1 * | 8/2014 | Jones | B32B 5/26 428/88 |

* cited by examiner

*Primary Examiner* — Jeremy R Pierce
(74) *Attorney, Agent, or Firm* — Myers Bigel, P.A (57) ABSTRACT

Multi-layered fabric laminates, such as, for example, those used as filler cloths and/or in manufacturing mattress foundations, are described along with methods of making and/or using the same.

19 Claims, 5 Drawing Sheets

MULTI-LAYERED FABRIC LAMINATES AND METHODS OF MAKING AND USING THE SAME

RELATED APPLICATION INFORMATION

This application claims the benefit of U.S. Provisional Patent Application Ser. No. 62/310,354, filed Mar. 18, 2016 and 62/320,071, filed Apr. 8, 2016, the disclosure of each of which is incorporated herein by reference in its entirety.

FIELD

The present invention generally relates to multi-layered fabric laminates, such as, for example, those used as filler cloths and/or in manufacturing mattress foundations, and to methods of making and/using the same.

BACKGROUND

Many current designs of mattress foundations (commonly referred to as "box springs") utilize a single layered filler cloth sewn to a border fabric or multilayered bordered panel, together which form a cover that is attached to and covers the top and sides of the foundation frame. Typical practices incorporate an internal layer of cardboard or some form of densified fiber web on top of the foundation frame just below the external filler cloth layer.

The main role of the insulating layer is to provide a durable, abrasion resistant material located between the filler cloth and the frame of the foundation. Foundation frames are typically constructed from wood and/or steel or other metals, and current filler cloths would become worn and would easily tear if positioned directly adjacent to the foundation frame. Insulating layers also provide opacity and cushioning that help obscure the steel wire grid or wooden slats in the foundation frame. Insulating layers are typically attached to the top and/or sides of the foundation frame by stapling to wooden frames or by hog-ringing to the sides of steel wire frames.

The resulting foundation frame with the incorporated insulation layer is then upholstered with a cover comprising a filler cloth sewn to the border panel, thus covering the top and sides of the foundation.

The drawback to using cardboard insulating layers is that their use has a tendency to produce noises in the foundation after limited use. The cardboard layer must also be attached, usually stapled, to a wooden foundation frame in a separate assembly step. This additional assembly operation is also required when using densified fibrous web insulating layers.

SUMMARY OF EXAMPLE EMBODIMENTS

One aspect of the present invention is directed to a fabric comprising a first nonwoven fabric layer; and a second nonwoven fabric layer that is a needlepunched nonwoven fabric and is laminated to a surface of the first nonwoven fabric layer, wherein at least one surface of the needlepunched nonwoven fabric comprises fused fibers and the at least one surface is an outer surface of the fabric.

Another aspect of the present invention is directed to a fabric comprising at least two nonwoven fabric layers that are laminated together, wherein the fabric has a bond strength at each adjacent fabric layer that is at least about 85 grams per inch as measured between each adjacent fabric layer in the machine direction and/or cross machine direction in accordance with AATCC 136. In some embodiments, the fabric has a bond strength at each adjacent fabric layer that is at least about 85 grams per inch as measured between each adjacent fabric layer in both the machine direction and cross machine direction in accordance with AATCC 136.

A further aspect of the present invention is directed to a method of manufacturing a fabric, the method comprising laminating together a first nonwoven fabric layer and a second nonwoven fabric layer that is a needlepunched nonwoven fabric, wherein at least one surface of the needlepunched nonwoven fabric comprises fused fibers and the at least one surface is an outer surface of the fabric.

An additional aspect of the present invention is directed to a mattress foundation comprising a fabric of the present invention.

Another aspect of the present invention includes the use of a fabric of the present invention in a mattress foundation.

DESCRIPTION OF EXAMPLE EMBODIMENTS

The present invention will now be described more fully hereinafter. This invention may, however, be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

It will be understood that when an element or layer is referred to as being "on", "attached to", "connected to", "coupled to", "coupled with" or "contacting" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. It will be appreciated by those of skill in the art that a structure referred to as being "directly on," "directly connected to," or "directly coupled to" another structure may partially or completely cover one or more surfaces of the other structure. It will also be appreciated by those of skill in the art that references to a structure or feature that is disposed "adjacent" another structure or feature may have portions that overlap or underlie the adjacent structure or feature.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

The term "about," as used herein when referring to a measurable value such as an amount or concentration and the like, is meant to encompass variations of +10%, ±5%, ±1%, ±0.5%, or even ±0.1% of the specified value as well as the specified value. For example, "about X" where X is the measurable value, is meant to include X as well as variations of ±10%, +5%, +1%, ±0.5%, or even ±0.1% of X. A range provided herein for a measureable value may include any other range and/or individual value therein.

As used herein, "ASTM" refers to ASTM, International, 100 Barr Harbor Drive, P.O. Box C700, West Conschoken, Pa. 19428-2959 USA.

As used herein, the terms "increase" and "enhance" (and grammatical variants thereof) refer to an increase in the specified parameter of greater than about 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more.

According to some embodiments, provided is a multilayered fabric comprising at least two layers (e.g., 2, 3, 4, 5, 6, or more) that are laminated together. A fabric of the present invention may be used as a filler cloth. The fabric may be attached, such as, for example, sewn, stapled, and/or the like, to a mattress foundation frame. The mattress foundation frame may be any size (e.g., sized for a foundation frame for a king bed, a queen bed, etc.) and/or may be any type of mattress foundation frame (e.g., a wood slat support, metal support, and/or any other support for a mattress). In some embodiments, a fabric of the present invention may be sewn in during a current mattress foundation assembly operation and/or sewn in using a current manufacturing process. In some embodiments, a fabric of the present invention may provide the abrasion resistance and/or opacity needed to eliminate the need for additional assembly operations and/or elements, such as, e.g., those associated with cardboard and/or other insulating layers. Thus, a fabric of the present invention may eliminate the need for cardboard and/or other insulating layers in a mattress foundation, which may eliminate an assembly operation associated with manufacturing mattress foundations and/or may provide a cost savings, such as, e.g., to mattress manufacturers.

A fabric layer in a fabric of the present invention may comprise a woven and/or nonwoven fabric layer. A "fabric layer" as used herein refers to a single fabric layer, such as, for example, a single nonwoven fabric layer. In some embodiments, a fabric of the present invention may comprise at least two layers (e.g., 2, 3, 4, 5, 6, or more) of a nonwoven fabric that may be the same as or different than another layer in the fabric. In some embodiments, a fabric of the present invention includes only two nonwoven fabric layers.

Any suitable woven fabric may be used in a fabric of the present invention. Example woven fabrics that may be used include, but are not limited to, plain weaves, basket weaves, twill weaves, satin weaves, and/or fancy weaves including jacquard weaves and/or dobby weaves.

Any suitable nonwoven fabric may be used in a fabric of the present invention. Example nonwoven fabrics that may be used in a fabric of the present invention include, but are not limited to, spun melt fabrics, stitchbonded fabrics, needlepunched fabrics, spunlaced fabrics, spunbonded fabrics, thermal bonded fabrics, powder bonded fabrics, chemical bonded fabrics, wet laid fabrics, and/or air laid fabrics. In some embodiments, at least one layer in a fabric of the present invention is a spunbonded nonwoven fabric and/or a stitchbonded nonwoven fabric. In some embodiments, at least one layer in a fabric of the present invention is a needlepunched nonwoven fabric. According to some embodiments, a fabric of the present invention comprises at least one needlepunched nonwoven fabric and at least one spunbonded nonwoven fabric and/or stitchbonded nonwoven fabric.

A nonwoven fabric layer that may be used in a fabric of the present invention may be mechanically treated and/or have undergone any suitable mechanical treatment, including, but not limited to, calendaring, creping, embossing, and/or stretching. In some embodiments, a nonwoven fabric layer that may be used in a fabric of the present invention may be and/or have been chemically treated for certain properties, such as, but not limited to, flame retardancy, oil, alcohol and/or water repellency, antistatic, antimicrobial, corrosion inhibition, color, opacity, dimensional stability, coefficient of friction, and/or the like. In some embodiments, a fabric layer of the present invention may have a three-dimensional pattern, such as, for example, a three-dimensional pattern that mimics the three-dimensional texture of a woven textile (e.g., hopsack, terrycloth or twill).

Any suitable fiber may be used in a fabric and/or fabric layer of the present invention in any suitable amount. Fibers may be natural fibers or synthetic fibers. Examples of fibers include, but are not limited to, bamboo fibers, cotton fibers, flax fibers, hemp fibers, jute fibers, polylactic acid fibers, silk fibers, wool (e.g., alpaca, angora, cashmere, chiengora, guanaco, llama, mohair, pashmina, sheep and/or vicuna) fibers, acrylic fibers, glass fibers, lyocell fibers, melamine fibers, modacrylic fibers, polyacrylonitrile (e.g., oxidized polyacrylonitrile) fibers, polyamide (e.g., nylon and/or aramid) fibers, polyester fibers, polyimide fibers, polylactic acid fibers, polyolefin (e.g., polyethylene and/or polypropylene) fibers, polyvinyl acetate fibers, polyvinyl alcohol fibers, rayon fibers, viscose fibers, modified viscose (e.g., silica-modified viscose) fibers, zylon fibers, and/or bicomponent fibers (e.g., fibers comprising a copolymer and/or fibers comprising two or more polymers (e.g., polyester and polypropylene)). In some embodiments, at least one layer in a fabric of the present invention comprises thermoplastic fibers. In some embodiments, a fabric and/or fabric layer of the present invention comprises polypropylene fibers, polyester fibers (e.g., polyethylene terephthalate fibers), copolyester fibers, polyethylene fibers, nylon fibers, and/or bicomponent fibers therefrom. Such fibers may be present in a fabric layer in an amount of about 1% to about 100% based on the fibers present in the layer (e.g., by weight of the layer or number of fibers present in the layer) or any range therein, such as, for example, about 1% to about 50%, about 40% to about 70%, about 60% to about 95%, or about 50% to about 100%. In some embodiments, a fabric layer may comprise polypropylene fibers, polyester fibers (e.g., polyethylene terephthalate fibers), copolyester fibers, polyethylene fibers, nylon fibers, bicomponent fibers, or blends thereof in an amount of about 1%, 5%, 10%, 15%, 20%, 25%, 30%, 35%, 40%, 45%, 50%, 55%, 60%, 65%, 70%, 75%, 80%, 85%, 90%, 95%, or 100% or any range therein based on the fibers present in the layer (e.g., by weight of the layer or number of fibers present in the layer).

In some embodiments, a fabric and/or fabric layer of the present invention (e.g., a nonwoven fabric layer) comprises polypropylene fibers, polyester fibers, and/or blends thereof. In some embodiments, polypropylene fibers, polyester fibers, and/or blends thereof may be present in a fabric layer of the present invention in any suitable amount. In some embodiments, a fabric layer may comprise polypropylene fibers, polyester fibers, or blends thereof in an amount of about 1% to about 100% or any range therein, such as, for example, about 1% to about 50%, about 40% to about 70%, about 60% to about 95%, or about 50% to about 100% based on the fibers present in the layer (e.g., by weight of the layer or number of fibers present in the layer). In some embodiments, a fabric layer may comprise polypropylene fibers, polyester fibers, or blends thereof in an amount of about 1%, 5%, 10%, 15%, 20%, 25%, 30%, 35%, 40%, 45%, 50%, 55%, 60%, 65%, 70%, 75%, 80%, 85%, 90%, 95%, or 100% or any range therein based on the fibers present in the layer (e.g., by weight of the layer or number of fibers present in the layer). According to some embodiments, a fabric of the present invention may comprise at least one nonwoven fabric layer that comprises polypropylene fibers in an amount of about 50% to about 100% by weight of the at least one nonwoven fabric layer and polyester fibers in an amount of about 0% to about 50% by weight of the at least one nonwoven fabric layer.

In some embodiments, a fabric and/or fabric layer of the present invention may comprise a bicomponent fiber, such as, for example, a sheath-core fiber (e.g., a fiber with a polypropylene (PP) sheath and a polyester core). In some embodiments, a bicomponent fiber used in a fabric of the present invention may be a copolyester (lower melt point)/polyester (PET) fiber, a polyethylene/polypropylene fiber, a polypropylene/polyester fiber, and/or a polyester/nylon fiber. In some embodiments, a bicomponent fiber used in a fabric of the present invention may comprise polycyclohexanedimethanol terephthalate, polytrimethylene terephthalate, polybutylene terephthalate, copolyesters and/or aliphatic polyesters such as polylactic acid and polyhydroxyalkanoates, polyamides, polyolefins including specialty nylons, 6,6, 11 and 12, copolyamides, polymethylpentene, and/or engineered polymers such as, e.g., polyphenylene sulfide, acetal, ionomers, polyvinyl alcohol, polyetherimide, thermoplastic polyurethanes, and the like. In some embodiments, a fabric and/or fabric layer of the present invention may comprise a polypropylene/polyethylene bicomponent fiber such as, e.g., a fiber having a PP sheath and polyethylene core. In some embodiments, a ratio of PP to polyethylene in a sheath-core fiber may be about 50% PP to 50% polyethylene. In some embodiments, a ratio of PP to polyethylene in a sheath-core fiber may be about 75% PP to 25% polyethylene. In some embodiments, a ratio of PP to polyethylene in a sheath-core fiber may be about 25% PP to 75% polyethylene.

A fabric of the present invention may have any suitable basis weight. In some embodiments, the fabric may have a basis weight in a range of about 3 ounces per square yard (osy) to about 10 osy, or any range therein, such as, for example, about 4 osy to about 8 osy, or about 5 osy to about 7 osy. In some embodiments, the fabric may have a basis weight of about 3, 3.5, 4, 4.5, 5, 5.5, 6, 6.5, 7, 7.5, 8, 8.5, 9, 9.5, or 10 osy, or any range therein.

A fabric layer of the fabric may have a basis weight in a range of about 0.25 osy to about 9 osy or any range therein, such as, for example, about 0.5 osy to about 5 osy, about 2.5 osy to about 8 osy, or about 1 osy to about 6 osy. In some embodiments, a fabric layer of the fabric has a basis weight of about 0.25, 0.5, 1, 1.5, 2, 2.5, 3, 3.5, 4, 4.5, 5, 5.5, 6, 6.5, 7, 7.5, 8, 8.5, or 9 osy, or any range therein. According to some embodiments, the fabric may comprise a first nonwoven fabric layer that has a basis weight in a range of about 0.5 osy to about 5 osy and/or a second nonwoven fabric layer that has a basis weight in a range of about 2.5 osy to about 8 osy.

A fabric of the present invention may have any suitable thickness. In some embodiments, the fabric may have a thickness in a range of about 0.025 inches to about 0.25 inches, or any range therein, such as, for example, about 0.04 inches to about 0.075 inches, about 0.1 inches to about 0.25 inches, or about 0.06 inches to about 0.125 inches. In some embodiments, the fabric may have a thickness of about 0.025, 0.03, 0.035, 0.04, 0.045, 0.05, 0.055, 0.06, 0.065, 0.07, 0.075, 0.08, 0.085, 0.09, 0.095, 0.1, 0.125, 0.15, 0.2, or 0.25 inches, or any range therein.

In some embodiments, a fabric of the present invention may have a thickness suitable for sewing the fabric to a mattress foundation border panel. In some embodiments, a fabric of the present invention may be sufficiently thin to sew it to a mattress foundation border panel. In some embodiments, the layer of a fabric of the present invention that is immediately adjacent to the wood and/or metal wire of a mattress foundation frame may provide abrasion resistance and/or opacity without the need for an additional, separate insulating layer (e.g., cardboard).

A fabric of the present invention may have a bond strength of about 50 grams per inch or more. In some embodiments, a fabric of the present invention may have a bond strength of about 1000 grams per inch or more. In some embodiments, the fabric may have a bond strength in a range of 50 grams per inch to about 1000 grams per inch, such as, for example, about 50 to about 150, about 90 to about 500, about 300 to about 600, about 700 to about 900, about 500 to about 1000, or about 100 to about 200 grams per inch. In some embodiments, the fabric may have a bond strength of at least about 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 grams per inch, or any range therein. The bond strength may be measured between adjacent layers of the fabric and/or may be measured in accordance with AATCC 136. In some embodiments, bond strength may be measured in machine direction (MD) and/or cross machine direction (XD). The bond strength between one or more adjacent layers of a fabric of the present invention may be such that the layers do not delaminate during cutting, sewing, and/or other operations associated with traditional and/or typical use of filler cloths in mattress foundation manufacturing. In some embodiments, a bond failure between two adjacent layers may be a destructive bond failure. "Destructive bond failure" as used herein refers to cohesive strength failure of at least one layer of two adjacent layers.

According to some embodiments, a fabric of the present invention may comprise at least two nonwoven fabric layers that are laminated together and may have a bond strength at each adjacent fabric layer that is at least about 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 425, 450, 475, 500, 525, 550, 575, 600, 625, 650, 675, 700 grams per inch or more. The bond strength may be measured between each adjacent fabric layer and/or may be measured in the machine direction (MD) and/or cross machine direction (XD) in accordance with AATCC 136. In some embodiments, a fabric of the present invention may have a bond strength at each adjacent fabric layer in the MD and/or XD in accordance with AATCC 136 that is at least about 180, 200, 220, 240, 260, 280, 300, or 320 grams per inch.

In some embodiments, a fabric of the present invention may provide increased strength by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300%, 350%, 400%, 450%, 500%, 550%, 600%, 650%, 700%, 750%, 800% or more compared to the strength of a current commercial filler cloth, such as, for example, a filler cloth currently provided on mattress foundations. In some embodiments, a fabric of the present invention may provide a strength that is at least about 2, 3, 4, 5, 6, 7, 8, 9 times or more compared to the strength of a current commercial filler cloth, such as, for example, a filler cloth currently provided on mattress foundations. In some embodiments, the bond strength may be measured in machine direction (MD) and/or cross machine direction (XD). Strength may be determined by bond strength, such as, for example, when measured in accordance with AATCC 136. In some embodiments, strength may be determined as measured in accordance with ASTM Standard D1682-64, "Standard Test Methods for Breaking Load and Elongation of Textile Fabrics," ASTM International (1975); ASTM Standard D5034-09, "Standard Test Methods for Breaking Load and Elongation of Textile Fabrics (Grab Test)," ASTM International (2013); ASTM Standard D5035-11, "Standard Test Methods for Breaking Load and Elongation of Textile Fabrics (Strip Method)," ASTM International (2011); ASTM Standard D1117-01, "Standard Guide for Evaluating Nonwoven Fabrics," ASTM International (2001), ASTM D3786/D3786M-09 "Bursting Strength of Textile Fabrics—Diaphragm Bursting Strength Tester Method", and/or ASTM D3787-07 "Bursting Strength of Textiles—Constant Rate of Traverse Ball Burst Test".

In some embodiments, a fabric of the present invention may provide increased durability by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more compared to the durability of a current commercial filler cloth, such as, for example, a filler cloth currently provided on mattress foundations. In some embodiments, durability may be determined as measured in accordance with ASTM Standard D4157-13, "Standard Test Method for Abrasion Resistance of Textile Fabrics (Oscillatory Cylinder Method)," ASTM International (2013); ASTM Standard D4158-08, "Standard Guide for Abrasion Resistance of Textile Fabrics (Uniform Abrasion)," ASTM International (2012); ASTM Standard D3389-10" "Standard Test Method for Coated Fabrics Abrasion Resistance," ASTM International (2010); ASTM Standard D3885-07a, "Standard Test Method for Abrasion Resistance of Textile Fabrics (Flexing and Abrasion Method)," ASTM International (2011); ASTM Standard D3886-99, "Standard Test Method for Abrasion Resistance of Textile Fabrics (Inflated Diaphragm Apparatus)," ASTM International (2011); ASTM Standard D4966-12, "Standard Test Method for Abrasion Resistance of Textile Fabrics (Martindale Abrasion Tester Method)," ASTM International (2013); ASTM Standard D3884-09, "Standard Test Method for Abrasion Resistance of Textile Fabrics (Rotary Platform, Double-Head Method)," ASTM International (2013); and/or ASTM Standard D1117-01, "Standard Guide for Evaluating Nonwoven Fabrics," ASTM International (2001). In some embodiments, increased durability may be visually determined and/or quantified (e.g., by determining visually fraying, tears, holes, delamination, shedding, and/or the like).

In some embodiments, a fabric of the present invention may provide increased abrasion resistance by about 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more compared to the abrasion resistance of a current commercial filler cloth, such as, for example, a filler cloth currently provided on mattress foundations and/or to a fabric comprising an unfused surface. In some embodiments, abrasion resistance may be determined as measured in accordance with ASTM Standard D4157-13, "Standard Test Method for Abrasion Resistance of Textile Fabrics (Oscillatory Cylinder Method)," ASTM International (2013); ASTM Standard D4158-08, "Standard Guide for Abrasion Resistance of Textile Fabrics (Uniform Abrasion)," ASTM International (2012); ASTM Standard D3389-10," "Standard Test Method for Coated Fabrics Abrasion Resistance," ASTM International (2010); ASTM Standard D3885-07a, "Standard Test Method for Abrasion Resistance of Textile Fabrics (Flexing and Abrasion Method)," ASTM International (2011); ASTM Standard D3886-99, "Standard Test Method for Abrasion Resistance of Textile Fabrics (Inflated Diaphragm Apparatus)," ASTM International (2011); ASTM Standard D4966-12, "Standard Test Method for Abrasion Resistance of Textile Fabrics (Martindale Abrasion Tester Method)," ASTM International (2013); ASTM Standard D3884-09, "Standard Test Method for Abrasion Resistance of Textile Fabrics (Rotary Platform, Double-Head Method)," ASTM International (2013); and/or ASTM Standard D1117-01, "Standard Guide for Evaluating Nonwoven Fabrics," ASTM International (2001). In some embodiments, decreased abrasion resistance may be visually determined and/or quantified (e.g., by determining visually fraying, tears, holes, delamination, piling, shedding, and/or the like).

In some embodiments, a fabric of the present invention and/or a fabric layer of the fabric may not delaminate during sewing and/or as a result of a sewing needle penetration force. In some embodiments, a fabric of the present invention and/or a fabric layer of the fabric may not delaminate as the fabric is sewn and/or as a result of the fabric moving through the sewing machinery.

In some embodiments, at least one (e.g., 1, 2, 3, or more) surface(s) of a fabric and/or fabric layer of the present invention comprises fused fibers. In some embodiments, an outer surface of a fabric of the present invention comprises fused fibers. The outer surface may be the backing side of a fabric of the present invention that may be used as a filler cloth for a mattress foundation. "Backing side" as used herein refers to the side of the fabric that faces a mattress foundation frame. A backing side is opposite to the facing side. "Facing side" as used herein refers to the side of the fabric that faces away from a mattress foundation frame, and may, for example, face towards a user and/or a mattress. In some embodiments, at least two outer surfaces of a fabric of the present invention comprise fused fibers. In some embodiments, at least two surfaces of a fabric layer of a fabric of the present invention comprise fused fibers. In some embodiments, only one surface of a fabric layer of a fabric of the present invention comprises fused fibers.

In some embodiments, a fabric of the present invention comprises a needlepunched nonwoven fabric that comprises fused fibers. In some embodiments, at least one surface of the needlepunched nonwoven fabric comprises fused fibers, and the at least one surface may be an outer surface of the fabric. According to some embodiments only one surface of a fabric and/or fabric layer of the present invention comprises fused fibers.

Fibers in a fabric of the present invention may be fused using a method known to those skilled in the art. In some embodiments, the fibers may be fused using a method comprising the application of heat or thermal energy. Such methods include, but are not limited to, heat calendaring, infrared heating, exposure to flame, and/or the like. In some embodiments, a fabric of the present invention comprises at least one fused side and the at least one fused side of the fabric may be outward facing in the laminate and/or may be positioned during sewing to face and/or be adjacent to the mattress foundation frame, which may provide additional abrasion resistance.

Figure 1:
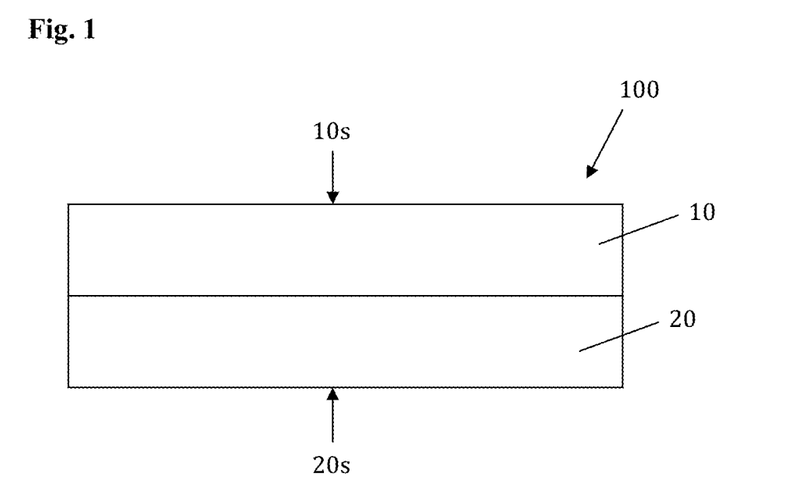
FIG. 1 illustrates a fabric according to example embodiments of the present invention.

Referring now to FIG. 1, according to some embodiments, a fabric 100 of the present invention may comprise a first woven and/or nonwoven fabric layer 10 and a second woven and/or nonwoven fabric layer 20 that are laminated together. In some embodiments, the second woven and/or nonwoven fabric layer 20 is a needlepunched nonwoven fabric. A surface of the first woven and/or nonwoven fabric layer 10 may be laminated to a surface of the second woven and/or nonwoven fabric layer 20 with no intermediate and/or intervening fabric layers, as shown in FIG. 1. The first woven and/or nonwoven fabric layer 10 and second woven and/or nonwoven fabric layer 20 may be laminated together using any suitable method, such as, e.g., by using a method described herein.

Figure 2:
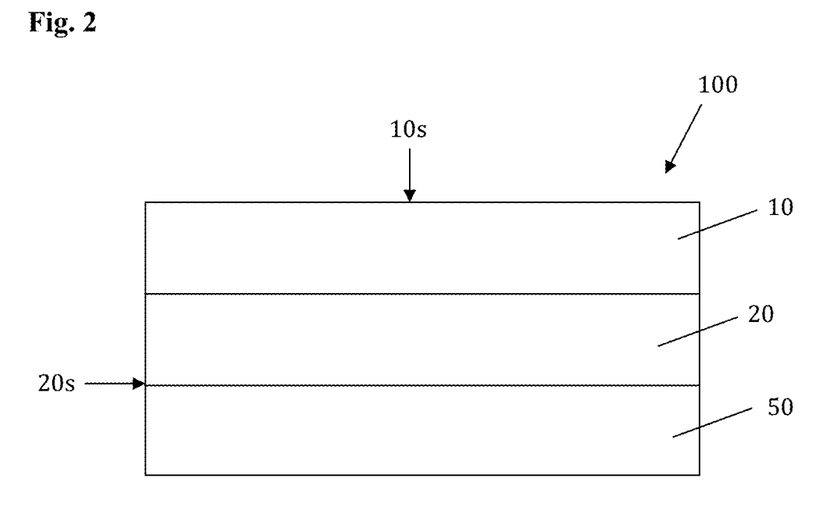
FIG. 2 illustrates a mattress foundation frame including the fabric of FIG. 1 according to example embodiments of the present invention.

The first woven and/or nonwoven fabric layer 10 provides a first outer surface 10s of the fabric 100 and the second woven and/or nonwoven fabric layer 20 provides a second outer surface 20s of the fabric 100. Referring now to FIG. 2, in some embodiments, the second outer surface 20s may face towards and/or may be directly in contact with a mattress foundation frame 50. In some embodiments, the first woven and/or nonwoven fabric layer 10 may be a facing layer and the woven and/or second nonwoven fabric layer 20 may be a backing layer. Thus, in some embodiments, the first outer surface 10s may face towards a mattress and/or come into contact with a mattress.

In some embodiments, the first woven and/or nonwoven fabric layer 10 may be a spunbonded nonwoven fabric or stitchbonded nonwoven fabric, and may comprise polypropylene fibers, polyester fibers, or blends thereof. The second woven and/or nonwoven fabric layer 20 may comprise a needlepunched nonwoven fabric and may comprise polypropylene fibers, polyester fibers, or blends thereof. The needlepunched nonwoven fabric may have at least one fused surface, which may be outward facing in the laminated structure (i.e., the at least one fused side may be opposite the side laminated to another layer). Thus, in some embodiments, the second outer surface 20s may comprise fused fibers. In some embodiments, only the second outer surface 20s of the second woven and/or nonwoven fabric layer 20 comprises fused fibers.

In some embodiments, a fabric of the present invention may comprise a coating. In some embodiments, the coating may be present on the facing side of a fabric of the present invention. The coating may comprise an additive, such as, but not limited to, a colorant, pigment, and/or the like, and any suitable polymeric binder. The polymeric binder may be used to adhere the additive to the fabric. A coating may provide a layer on the surface of the fabric, which may impart a desired property to the side it is applied. These properties may include, but are not limited to, color, opacity, abrasion resistance, modify coefficient of friction, and/or the like. An example coating may comprise any suitable polymeric binder(s) (e.g., an acrylic latex binder) and a blend containing a gray pigment (e.g., a blend of titanium dioxide and carbon black), which may provide a desired color and/or appropriate opacity to the fabric. This pigment may be held in place on the fabric by the binder system.

According to some embodiments, provided is a method of manufacturing a fabric of the present invention. The method may comprise laminating together at least to fabric layers, such as, for example, a first woven and/or nonwoven fabric layer and a second woven and/or nonwoven fabric layer. In some embodiments, at least one of the fabric layers is a needlepunched nonwoven fabric comprising fused fibers. In some embodiments, the method comprises laminating a surface of one fabric layer to a surface of another fabric layer with no intermediate and/or intervening fabric layers.

The two or more layers of a fabric of the present invention may be laminated together using method(s) known to those of skill in the art. Example lamination methods include, but are not limited to, thermal bonding, ultrasonic bonding, adhesive bonding, stitching, needling, mechanically entangling, and/or other methods known to those of skill in the art. In some embodiments, at least two layers of a fabric of the present invention may be laminated together using ultrasonic bonding. In some embodiments, at least two layers of a fabric of the present invention may be laminated together using adhesive bonding. Any suitable adhesive may be used, such as, for example, a flame resistant adhesive material, water-based adhesive, solvent-based adhesive, hot melt adhesive, powder adhesive, web adhesive, pressure sensitive adhesive, and/or film adhesive.

The foregoing is illustrative of the present invention, and is not to be construed as limiting thereof. The invention is further defined by the following claims, with equivalents of the claims to be included therein. All publications, patent applications, patents, patent publications, and other references cited herein are incorporated by reference in their entireties for the teachings relevant to the sentence and/or paragraph in which the reference is presented.

EXAMPLES

Example 1—Bond Strength Testing

The bond strength for various fabrics was tested in accordance with AATCC 136 and the results are provided in Table 1. The weight values are as tested and may vary compared to the intended commercial design. The fabrics tested are as follows:

Hanes commercial filler cloth sample: a fabric having five layers, which are from facing side to backing side: a top/first spunbond polypropylene layer having a basis weight of 0.95 osy, a second spunbond polypropylene layer having a basis weight of 0.96 osy, a third spunbond polypropylene layer having a basis weight of 0.95 osy, a carded polypropylene/polyester bicomponent fiber web having a basis weight of 2.30 osy, and a bottom polypropylene spunbond layer having a basis weight of 1.24 osy.

6661-50003: a fabric having two layers, which are from facing side to backing side: a 2.25 osy spunbond polypropylene layer ultrasonically bonded to a 4.0 osy 70% polypropylene/30% polyester needlepunch layer with the bottom needlepunch layer fused on one side (i.e., the side that isn't laminated to the top layer).

Sample #1: a fabric having two layers, which are from facing side to backing side: a 2.65 osy coated 100% polyester stitchbond layer ultrasonic bonded to a bottom 4.0 osy 70% polypropylene/30% polyester needlepunch layer fused on one side. The top layer is bonded to the unfused side of the bottom layer.

Sample #2: a fabric having two layers, which are from facing side to backing side: a 2.65 osy coated 100% polyester stitchbond adhesively bonded to a 4.0 osy 70% polypropylene/30% polyester needlepunch fused on one side. The top layer is bonded to the unfused side of the bottom layer.

Sample #3: a fabric having two layers, which are from facing side to backing side: a 2.65 osy coated 100% polyester stitchbond ultrasonically bonded to a 3.7 osy 100% polyester needlepunch with no fused side.

Sample #4: a fabric having two layers, which are from facing side to backing side: a 2.25 osy spunbond polypropylene layer ultrasonically bonded to a 4.0 osy 70% PP/30% PET needlepunch layer with no fused side.

TABLE 1

Bond strength values for test fabric samples.

| | | Sample | | | | |
|---|---|---|---|---|---|---|
| | | 6661-50003 | Sample 1 | Sample 2 | Sample 3 | Sample 4 |
| Bond Strength (g/in) | MD | 498 | 297 | 397 | 370 | 385 |
| | XD | 531 | 224 | 285 | 336 | 235 |

MD = Machine Direction
XD = Cross Machine Direction

One commercial fabric manufactured by Hanes Industries of Conover, N.C. that is marketed as a filler cloth was obtained and each layer of the commercial fabric sample was analyzed and weighed. Bond strength between each of the layers in the Hanes commercial fabric are provided in Table 2. The Hanes commercial fabric had the following layers: Layer 1—top grey PP layer; Layer 2—second grey PP layer; Layer 3—third grey PP layer; Layer 4—white PP/PET layer; and Layer 5—white spunbond PP layer.

TABLE 2

Bond strength values for Hanes commercial filler cloth sample.

| Bond between | | MD | XD |
|---|---|---|---|
| Layer 1 & 2 | g/in | 93 | 77 |
| Layer 2 & 3 | g/in | 91 | 105 |
| Layer 3 & 4 | g/in | 77 | 88 |
| Layer 4 & 5 | g/in | 154 | 172 |

Example 2—Abrasion Resistance Testing

Figure 3:
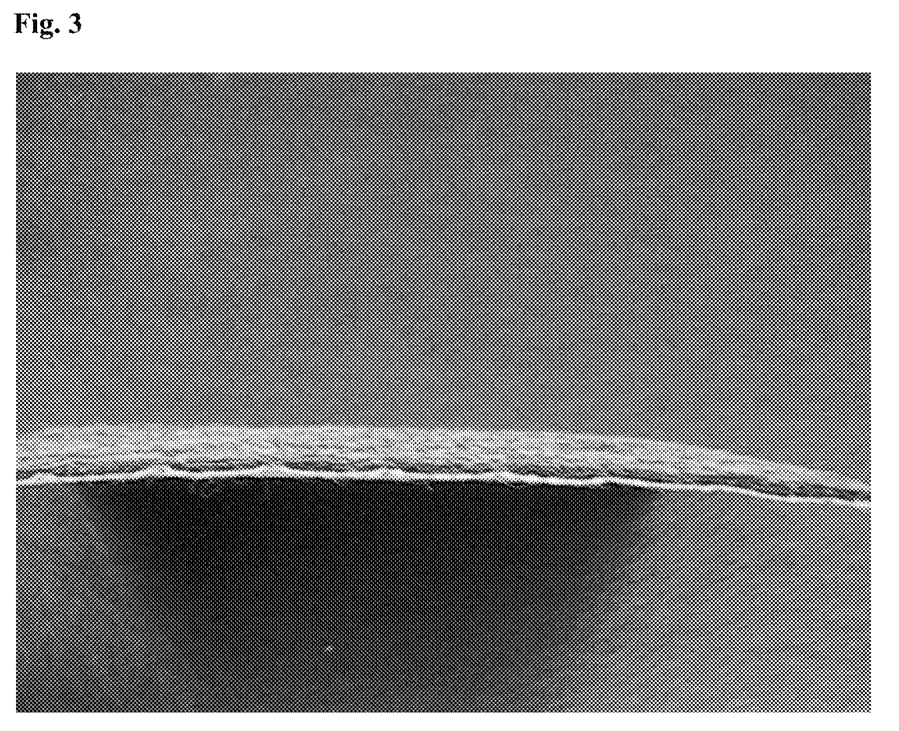
FIG. 3 is a photograph of the 6661-50003 fabric according to example embodiments of the present invention after abrasion resistance testing.
Figure 4:
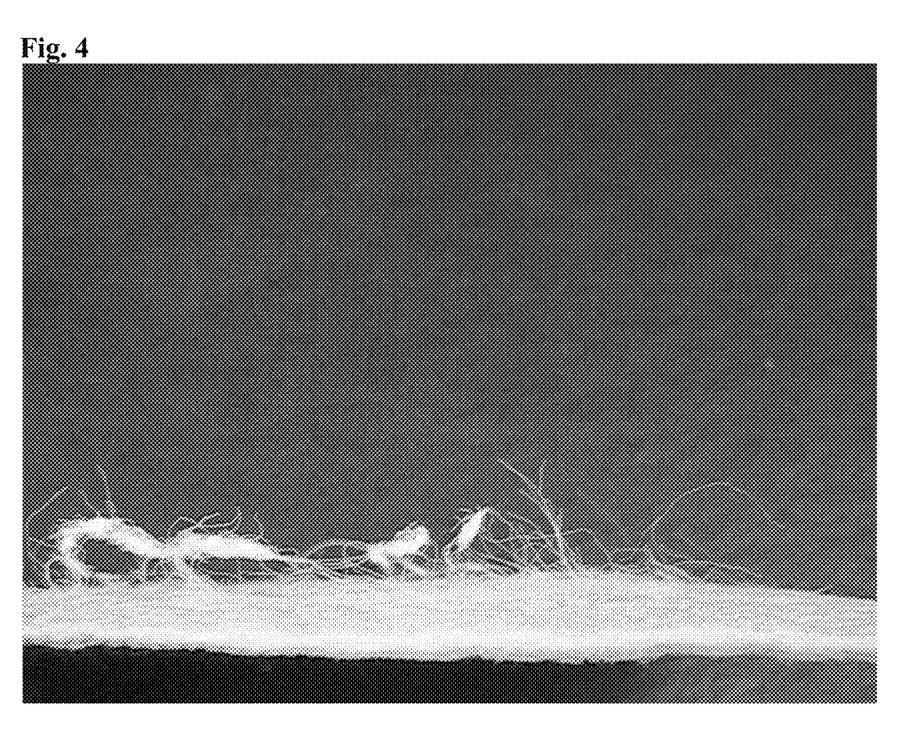
FIG. 4 is a photograph of the Hanes commercial filler cloth sample after abrasion resistance testing.
Figure 5:
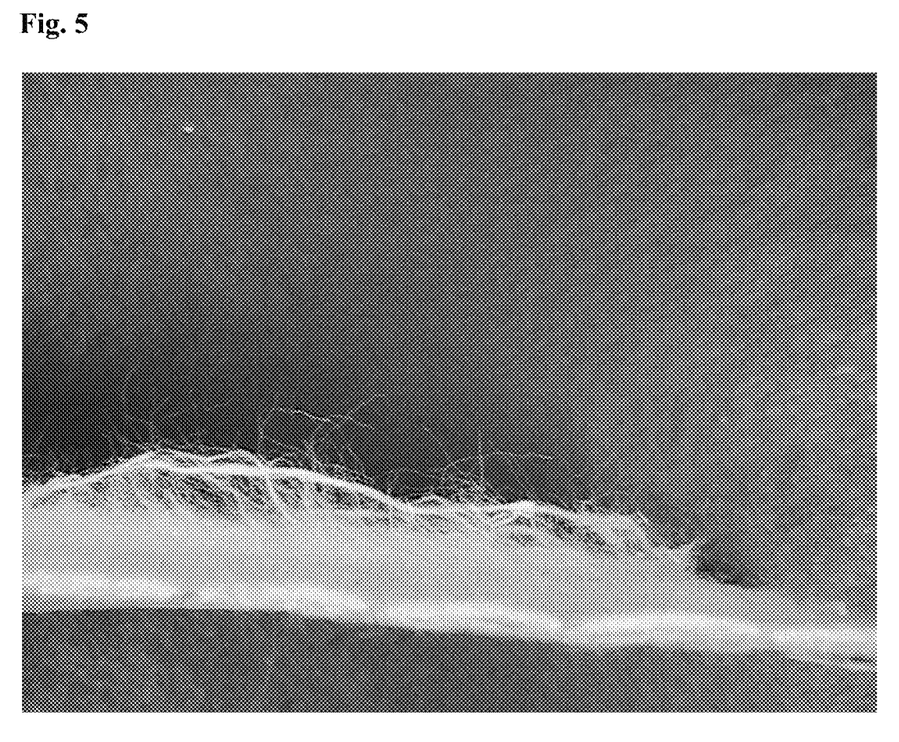
FIG. 5 is a photograph of the fabric including a needlepunched layer having an unfused surface after abrasion resistance testing.
Figure 6:
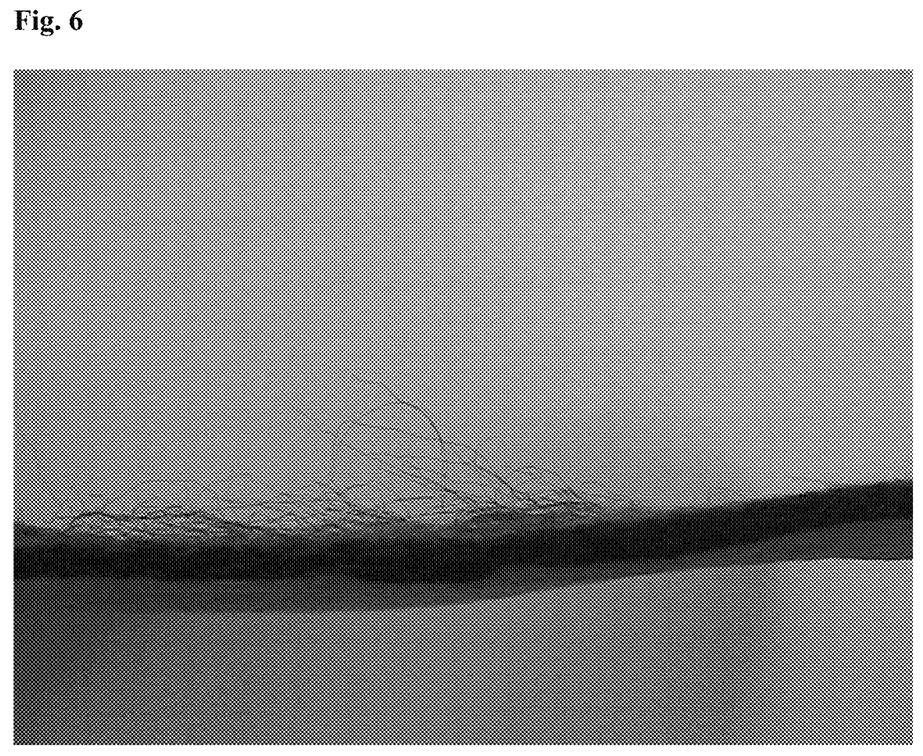
FIG. 6 is a photograph of the Sample #4 fabric after abrasion resistance testing

The abrasion resistance for various fabrics was tested as measured in accordance with ASTM Standard D3884-09, "Standard Test Method for Abrasion Resistance of Textile Fabrics (Rotary Platform, Double-Head Method)," ASTM International (2013) using CS-10 wheels with 500 gram weight and 200 cycles and the results are provided in FIGS. 3-6. For all samples, the backing side of the fabric was tested in accordance with ASTM Standard D3884-09. FIG. 3 shows the 6661-50003 fabric after testing. FIG. 4 shows the Hanes commercial filler cloth sample after testing. FIG. 5 shows a fabric consistent with Sample #3 having an unfused surface. FIG. 6 shows the Sample #4 fabric after testing and may be compared to the 6661-50003 fabric. In contrast to the 6661-50003 fabric, the Sample #4 fabric has a needlepnch layer with no fused side. Visual examination of the fabrics shown in FIGS. 4-6 showed significant damage (e.g., fraying) due to the abrasion testing. In contrast, the fabric shown in FIG. 3 showed no or minimal visual damage (e.g., fraying) after the abrasion testing.

The foregoing is illustrative of the present invention, and is not to be construed as limiting thereof. The invention is defined by the following claims, with equivalents of the claims to be included therein. All publications, patent applications, patents, patent publications, and other references cited herein are incorporated by reference in their entireties for the teachings relevant to the sentence and/or paragraph in which the reference is presented.

That which is claimed is:

1. A fabric comprising:
   a first nonwoven stitchbond fabric layer; and
   a second nonwoven fabric layer that is a needlepunched nonwoven fabric and is laminated to a surface of the first nonwoven stitchbond fabric layer,
   wherein at least one surface of the needlepunched nonwoven fabric comprises fused fibers and the at least one surface is an outer surface of the fabric,
   wherein the first nonwoven stitchbond fabric layer comprises cellulose fibers, viscose fibers, or a combination thereof,
   wherein the second nonwoven fabric layer comprises bicomponent fibers in an amount of about 10% to about 50% by weight of the second nonwoven fabric layer, and
   wherein the fabric has a bond strength of at least about 50 grams per inch as measured between the first nonwoven stitchbond fabric layer and the second nonwoven fabric layer as measured in the machine direction and/or cross machine direction in accordance with AATCC 136.

2. The fabric of claim 1, wherein the first nonwoven stitchbond fabric layer further comprises polypropylene fibers, polyester fibers, copolyester fibers, polyethylene fibers, bicomponent fibers, or blends thereof.

3. The fabric of claim 1, wherein the first and second nonwoven fabric layers are laminated together using a thermal, ultrasonic, and/or adhesive method.

4. The fabric of claim 1, wherein the first nonwoven stitchbond fabric layer and/or the second nonwoven fabric layer is a single nonwoven layer.

5. The fabric of claim 1, wherein the fabric has a basis weight in a range of about 3 ounces per square yard (osy) to about 10 osy.

6. The fabric of claim 1, wherein the second nonwoven fabric layer further comprises polypropylene fibers in an amount of about 10% to about 50% by weight of the second nonwoven fabric layer.

7. The fabric of claim 1, wherein the fabric has a thickness in a range of about 0.025 to about 0.25 inches.

8. The fabric of claim 1, wherein the fabric has a bond strength at each adjacent fabric layer that is at least about 85 grams per inch as measured between each adjacent fabric layer in the machine direction and/or cross machine direction in accordance with AATCC 136.

9. The fabric of claim 8, wherein the bond strength is at least about 200 grams per inch as measured between each adjacent fabric layer in the machine direction and/or cross machine direction in accordance with AATCC 136.

10. The fabric of claim 1, wherein the first nonwoven stitchbond fabric layer comprises viscose fibers.

11. The fabric of claim 1, wherein the first nonwoven stitchbond fabric layer further comprises fibers selected from the group consisting of polyester fibers, aramid fibers, bicomponent fibers, and/or silica-modified viscose fibers.

12. The fabric of claim 1, wherein the first nonwoven stitchbond fabric layer comprises viscose fibers and polyester fibers.

13. The fabric of claim 1, wherein the first nonwoven stitchbond fabric layer comprises viscose fibers and bicomponent fibers.

14. The fabric of claim 1, wherein the first nonwoven stitchbond fabric layer further comprises a flame retardant.

15. The fabric of claim 1, wherein the second nonwoven fabric layer further comprises polypropylene fibers, polyester fibers, copolyester fibers, polyethylene fibers, or blends thereof.

16. The fabric of claim 1, wherein the first nonwoven stitchbond fabric layer is devoid of a flame retardant.

17. The fabric of claim 1, wherein the bond strength between the first nonwoven stitchbond fabric layer and the second nonwoven fabric layer is in a range from about 50 grams per inch to about 700 grams per inch as measured between the first nonwoven stitchbond fabric layer and the second nonwoven fabric layer in the machine direction and/or cross machine direction in accordance with AATCC 136.

18. The fabric of claim 8, wherein the bond strength between each adjacent fabric layer is in a range from about 200 grams per inch to about 700 grams per inch as measured between each adjacent fabric layer in the machine direction and/or cross machine direction in accordance with AATCC 136.

19. A mattress foundation comprising the fabric of claim 1.

* * * * *